United States Patent
Nguyen et al.

(10) Patent No.: US 8,372,278 B1
(45) Date of Patent: Feb. 12, 2013

(54) LIQUID FUEL STRAINER ASSEMBLY

(75) Inventors: Peter N. C. Nguyen, Sterling Heights, MI (US); Gordon G. Rinke, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/425,815

(22) Filed: Mar. 21, 2012

(51) Int. Cl.
 *B01D 35/02* (2006.01)
 *B01D 35/26* (2006.01)
(52) U.S. Cl. ............ 210/172.2; 210/172.3; 210/172.4; 210/416.4; 210/483; 123/509; 123/196 A; 123/198 C; 137/565.17; 137/544
(58) Field of Classification Search .................. None
 See application file for complete search history.

(56) References Cited

U.S. PATENT DOCUMENTS

| | | | | |
|---|---|---|---|---|
| 796,910 A * | 8/1905 | Hernan | ...... | 210/172.2 |
| 991,212 A * | 5/1911 | Kincaid | ...... | 210/172.2 |
| 1,055,744 A * | 3/1913 | Hans | ...... | 210/305 |
| 1,058,133 A * | 4/1913 | Yourtree | ...... | 210/313 |
| 1,072,371 A * | 9/1913 | Stone | ...... | 137/590 |
| 1,083,413 A * | 1/1914 | Smith | ...... | 210/313 |
| 1,113,683 A * | 10/1914 | Pfahler | ...... | 210/313 |
| 1,191,741 A * | 7/1916 | Scull | ...... | 210/172.3 |
| 1,235,438 A * | 7/1917 | Chynoweth | ...... | 210/172.3 |
| 1,305,355 A * | 6/1919 | Gulick | ...... | 184/6.24 |
| 1,394,011 A * | 10/1921 | Hills | ...... | 210/172.4 |
| 1,395,949 A * | 11/1921 | Eckman | ...... | 219/205 |
| 1,518,686 A * | 12/1924 | Bland | ...... | 210/172.2 |
| 1,548,400 A * | 8/1925 | Walker | ...... | 210/172.2 |
| 1,568,796 A * | 1/1926 | Breer | ...... | 210/130 |
| 1,623,728 A * | 4/1927 | Hooton | ...... | 210/534 |
| 1,773,134 A * | 8/1930 | Fisher | ...... | 210/167.02 |
| 1,865,209 A * | 6/1932 | Pretsch | ...... | 210/461 |
| 2,002,407 A * | 5/1935 | Lemke | ...... | 210/533 |
| 2,015,274 A * | 9/1935 | Johnston | ...... | 210/250 |
| 2,057,779 A * | 10/1936 | Jacobs | ...... | 210/172.3 |
| 2,253,509 A * | 8/1941 | Dort | ...... | 210/148 |
| 2,261,915 A * | 11/1941 | Korte et al. | ...... | 417/423.3 |
| 2,306,297 A * | 12/1942 | Curtis | ...... | 96/214 |
| 2,336,150 A * | 12/1943 | Horvath | ...... | 210/170.01 |
| 2,339,303 A * | 1/1944 | Tillery | ...... | 220/564 |
| 2,342,519 A * | 2/1944 | Pierce | ...... | 123/198 A |
| 2,367,055 A * | 1/1945 | Baugh et al. | ...... | 137/563 |
| 2,394,154 A * | 2/1946 | Curtis et al. | ...... | 222/383.2 |
| 2,419,146 A * | 4/1947 | Kimm et al. | ...... | 222/189.11 |
| 2,512,877 A * | 6/1950 | Rike | ...... | 210/172.2 |
| 2,539,820 A * | 1/1951 | Duchesneau | ...... | 210/136 |
| 2,624,463 A * | 1/1953 | Freese | ...... | 210/519 |
| 2,633,245 A * | 3/1953 | Flamm et al. | ...... | 210/172.3 |
| 2,644,514 A * | 7/1953 | Potter | ...... | 137/574 |
| 2,711,828 A * | 6/1955 | Webb et al. | ...... | 210/489 |
| 2,767,736 A * | 10/1956 | Lackinger | ...... | 137/574 |

(Continued)

*Primary Examiner* — Robert James Popovics
(74) *Attorney, Agent, or Firm* — Quinn Law Group, PLLC

(57) ABSTRACT

A liquid fuel strainer assembly includes a filter body of filtration media. The filter body includes a first wall and an opposing second wall shaped to define an enclosed interior space therebetween. A fitting connects the filter body to a fuel pump, and provides fluid communication from the enclosed interior space of the filter body to the fuel pump. A flexible tube is disposed within the enclosed interior space of the filter body. The flexible tube prevents the first wall and the second wall from collapsing toward each other to allow fuel to flow through the enclosed interior space toward the fitting. The flexible tube is not attached to either the fitting or the filter body, and is freely moveable within the enclosed interior space of the filter body.

10 Claims, 2 Drawing Sheets

U.S. PATENT DOCUMENTS

| | | | | | |
|---|---|---|---|---|---|
| 2,770,362 | A | * | 11/1956 | Paquin | 210/304 |
| 2,788,125 | A | * | 4/1957 | Webb | 210/172.4 |
| 2,810,482 | A | * | 10/1957 | Kasten | 210/460 |
| 2,863,396 | A | * | 12/1958 | Heintz | 417/458 |
| 2,877,903 | A | * | 3/1959 | Veres | 210/462 |
| 2,905,327 | A | * | 9/1959 | Phillips | 210/463 |
| 2,923,411 | A | * | 2/1960 | Oster | 210/172.4 |
| 2,933,188 | A | * | 4/1960 | Jacula | 210/172.3 |
| 2,937,755 | A | * | 5/1960 | Szwargulski | 210/172.3 |
| 2,970,606 | A | * | 2/1961 | Williams | 137/268 |
| 3,020,950 | A | * | 2/1962 | Schraivogel | 137/549 |
| 3,022,053 | A | * | 2/1962 | Hoyt | 261/18.3 |
| 3,023,905 | A | * | 3/1962 | McDougal et al. | 210/172.4 |
| 3,049,171 | A | * | 8/1962 | Neuerburg et al. | 137/549 |
| 3,061,104 | A | * | 10/1962 | Schaffner | 210/172.3 |
| 3,108,065 | A | * | 10/1963 | McMichael | 210/172.3 |
| 3,121,473 | A | * | 2/1964 | Blystone | 184/109 |
| 3,123,445 | A | * | 3/1964 | Heath | 422/274 |
| 3,143,187 | A | * | 8/1964 | Stefan | 184/6.24 |
| 3,165,468 | A | * | 1/1965 | Strader | 210/172.2 |
| 3,171,806 | A | * | 3/1965 | Schaffner | 210/172.4 |
| 3,173,469 | A | * | 3/1965 | Shockey | 137/590 |
| 3,206,033 | A | * | 9/1965 | Kern, Jr. | 210/249 |
| 3,266,312 | A | * | 8/1966 | Coleman et al. | 73/313 |
| 3,282,428 | A | * | 11/1966 | Rosaen | 210/132 |
| 3,291,184 | A | * | 12/1966 | Varvel | 431/121 |
| 3,294,025 | A | * | 12/1966 | Niemeyer et al. | 210/416.4 |
| 3,295,297 | A | * | 1/1967 | Collins | 96/155 |
| 3,306,454 | A | * | 2/1967 | Webb | 210/172.3 |
| 3,314,544 | A | * | 4/1967 | Rosaen | 210/172.3 |
| 3,480,149 | A | * | 11/1969 | Houser | 210/445 |
| 3,643,802 | A | * | 2/1972 | Jackson, Jr. | 210/172.3 |
| 3,659,965 | A | * | 5/1972 | Ebert et al. | 417/363 |
| 3,726,310 | A | * | 4/1973 | Coscia | 137/576 |
| 3,729,273 | A | * | 4/1973 | Shimrony | 417/79 |
| 3,731,805 | A | * | 5/1973 | Schniers | 210/86 |
| 3,734,292 | A | * | 5/1973 | Bell | 210/172.3 |
| 3,744,640 | A | * | 7/1973 | Grover | 210/463 |
| 3,747,761 | A | * | 7/1973 | Heinrich, Jr. | 210/120 |
| 3,763,840 | A | * | 10/1973 | Schimmelpfenig | 137/469 |
| 3,786,920 | A | * | 1/1974 | Raymond | 210/90 |
| 3,826,372 | A | * | 7/1974 | Bell | 210/172.4 |
| 3,833,124 | A | * | 9/1974 | Sugiyama et al. | 210/460 |
| 3,875,059 | A | * | 4/1975 | Maschino | 210/172.3 |
| 3,881,457 | A | * | 5/1975 | Benner et al. | 123/434 |
| 3,900,397 | A | * | 8/1975 | Bell | 210/128 |
| 3,910,464 | A | * | 10/1975 | Schlanzky | 222/180 |
| 3,949,720 | A | * | 4/1976 | Zipprich et al. | 123/518 |
| 4,077,884 | A | * | 3/1978 | Naumann | 210/172.3 |
| 4,107,052 | A | * | 8/1978 | Yoshino et al. | 210/534 |
| 4,129,503 | A | * | 12/1978 | Joseph | 210/232 |
| 4,162,549 | A | * | 7/1979 | Charles et al. | 4/318 |
| 4,179,036 | A | * | 12/1979 | Pasini | 220/563 |
| 4,279,232 | A | * | 7/1981 | Schuster et al. | 123/516 |
| 4,303,513 | A | * | 12/1981 | Lundquist | 210/132 |
| 4,304,664 | A | | 12/1981 | McAlindon et al. | |
| 4,312,753 | A | * | 1/1982 | Bell | 210/250 |
| 4,354,521 | A | * | 10/1982 | Harde | 137/571 |
| 4,371,181 | A | * | 2/1983 | Monigold et al. | 280/834 |
| 4,397,333 | A | * | 8/1983 | Liba et al. | 137/574 |
| 4,420,396 | A | * | 12/1983 | Yamamoto et al. | 210/416.4 |
| 4,453,564 | A | * | 6/1984 | Bergesio | 137/574 |
| 4,503,885 | A | * | 3/1985 | Hall | 137/574 |
| 4,512,884 | A | * | 4/1985 | Wheatley | 210/136 |
| 4,561,977 | A | * | 12/1985 | Sasaki | 210/356 |
| 4,569,637 | A | * | 2/1986 | Tuckey | 417/360 |
| 4,595,030 | A | * | 6/1986 | Yazaki | 137/203 |
| 4,617,121 | A | * | 10/1986 | Yokoyama | 210/416.4 |
| 4,618,422 | A | * | 10/1986 | Sasaki et al. | 210/172.3 |
| 4,626,347 | A | * | 12/1986 | Neglio | 210/232 |
| 4,637,351 | A | * | 1/1987 | Pakula | 123/25 J |
| 4,645,600 | A | * | 2/1987 | Filippi | 210/416.4 |
| 4,684,463 | A | * | 8/1987 | Mizusawa | 210/172.3 |
| 4,694,857 | A | * | 9/1987 | Harris | 137/565.24 |
| 4,743,370 | A | * | 5/1988 | Mizusawa | 210/460 |
| 4,783,260 | A | * | 11/1988 | Kurihara | 210/232 |
| 4,790,185 | A | * | 12/1988 | Fedelem et al. | 73/317 |
| 4,828,694 | A | * | 5/1989 | Leason | 210/167.08 |
| 4,842,006 | A | * | 6/1989 | Scheurenbrand et al. | 137/202 |
| 4,844,704 | A | * | 7/1989 | Jiro | 417/307 |
| 4,851,118 | A | * | 7/1989 | Kurihara | 210/315 |
| 4,853,123 | A | | 8/1989 | Hayes et al. | |
| 4,853,125 | A | * | 8/1989 | Hanabusa | 210/172.2 |
| 4,861,478 | A | * | 8/1989 | Hall | 210/416.4 |
| 4,869,225 | A | * | 9/1989 | Nagata et al. | 123/509 |
| 4,874,510 | A | * | 10/1989 | Akira et al. | 210/172.4 |
| 4,877,001 | A | * | 10/1989 | Kenealy et al. | 123/519 |
| 4,961,850 | A | * | 10/1990 | Combest | 210/232 |
| 4,966,522 | A | * | 10/1990 | Koyama | 415/121.2 |
| 4,974,570 | A | * | 12/1990 | Szwargulski et al. | 123/509 |
| 4,989,572 | A | * | 2/1991 | Giacomazzi et al. | 123/514 |
| 5,049,267 | A | * | 9/1991 | Sasaki et al. | 210/172.3 |
| 5,049,271 | A | * | 9/1991 | Cain | 210/250 |
| 5,055,187 | A | * | 10/1991 | Ito et al. | 210/172.4 |
| 5,056,492 | A | * | 10/1991 | Banse | 123/509 |
| 5,084,166 | A | * | 1/1992 | Shiraga et al. | 210/172.4 |
| 5,085,768 | A | * | 2/1992 | Murakami et al. | 210/222 |
| 5,111,844 | A | * | 5/1992 | Emmert et al. | 137/565.33 |
| 5,120,434 | A | * | 6/1992 | Yoshida | 210/172.4 |
| 5,146,901 | A | * | 9/1992 | Jones | 123/516 |
| 5,169,531 | A | * | 12/1992 | Shiraga et al. | 210/460 |
| 5,174,841 | A | * | 12/1992 | Combest | 156/73.1 |
| 5,186,152 | A | * | 2/1993 | Cortochiato et al. | 123/514 |
| 5,236,000 | A | * | 8/1993 | Kizer | 137/38 |
| 5,249,594 | A | * | 10/1993 | Kizer | 137/15.08 |
| 5,263,458 | A | * | 11/1993 | Fujino et al. | 123/514 |
| 5,273,193 | A | * | 12/1993 | Murakami et al. | 222/189.06 |
| 5,312,545 | A | * | 5/1994 | Starin et al. | 210/172.6 |
| 5,341,842 | A | * | 8/1994 | Chih et al. | 137/574 |
| 5,389,245 | A | * | 2/1995 | Jaeger et al. | 210/129 |
| 5,395,520 | A | * | 3/1995 | Ito et al. | 210/172.4 |
| 5,398,659 | A | * | 3/1995 | Zimmerman et al. | 123/514 |
| 5,409,608 | A | * | 4/1995 | Yoshida et al. | 210/315 |
| 5,415,146 | A | * | 5/1995 | Tuckey | 123/509 |
| 5,431,143 | A | * | 7/1995 | Brown | 123/514 |
| 5,441,637 | A | * | 8/1995 | Gutjahr et al. | 210/232 |
| 5,445,503 | A | * | 8/1995 | Kmiec et al. | 417/360 |
| 5,494,575 | A | * | 2/1996 | Kitajima et al. | 210/167.04 |
| 5,511,957 | A | * | 4/1996 | Tuckey et al. | 417/313 |
| 5,538,633 | A | * | 7/1996 | Kitajima et al. | 210/445 |
| 5,547,568 | A | * | 8/1996 | Sasaki | 210/172.4 |
| 5,582,729 | A | * | 12/1996 | Shioda et al. | 210/461 |
| 5,584,988 | A | * | 12/1996 | Hashimoto et al. | 210/136 |
| 5,596,971 | A | * | 1/1997 | Kidokoro | 123/516 |
| 5,607,578 | A | * | 3/1997 | Ohkouchi et al. | 210/172.4 |
| 5,613,476 | A | * | 3/1997 | Oi et al. | 123/509 |
| 5,639,367 | A | * | 6/1997 | Ohzeki et al. | 210/315 |
| 5,642,719 | A | * | 7/1997 | Brown | 123/509 |
| 5,647,329 | A | * | 7/1997 | Bucci et al. | 123/509 |
| 5,665,229 | A | * | 9/1997 | Fitzpatrick et al. | 210/232 |
| 5,702,237 | A | * | 12/1997 | Hill | 417/313 |
| 5,716,522 | A | | 2/1998 | Chilton et al. | |
| 5,720,878 | A | * | 2/1998 | Bolyard | 210/337 |
| 5,722,374 | A | * | 3/1998 | Kidokoro et al. | 123/516 |
| 5,728,292 | A | * | 3/1998 | Hashimoto et al. | 210/136 |
| 5,732,684 | A | * | 3/1998 | Thompson | 123/514 |
| 5,746,185 | A | * | 5/1998 | Kidokoro et al. | 123/516 |
| 5,746,186 | A | * | 5/1998 | Kidokoro | 123/516 |
| 5,776,341 | A | * | 7/1998 | Barnard et al. | 210/306 |
| 5,795,468 | A | * | 8/1998 | Reising et al. | 210/172.4 |
| 5,876,599 | A | * | 3/1999 | Sylvester et al. | 210/232 |
| 5,900,140 | A | * | 5/1999 | Nagai et al. | 210/85 |
| 5,900,148 | A | * | 5/1999 | Izutani et al. | 210/416.4 |
| 5,902,480 | A | * | 5/1999 | Chilton et al. | 210/317 |
| 5,915,926 | A | * | 6/1999 | Janik et al. | 417/44.2 |
| 5,922,205 | A | * | 7/1999 | Patterson | 210/634 |
| 5,924,445 | A | * | 7/1999 | Ambrose et al. | 137/549 |
| 5,928,507 | A | * | 7/1999 | Chiga | 210/172.4 |
| 6,014,957 | A | * | 1/2000 | Robinson | 123/509 |
| 6,098,599 | A | * | 8/2000 | Muldoon et al. | 123/514 |
| 6,143,169 | A | * | 11/2000 | Lee | 210/167.02 |
| 6,156,201 | A | * | 12/2000 | Ueda et al. | 210/416.4 |
| 6,165,373 | A | * | 12/2000 | Agner | 210/767 |
| 6,176,133 | B1 | * | 1/2001 | Hutter et al. | 73/306 |
| 6,183,632 | B1 | * | 2/2001 | Covington | 210/167.02 |
| 6,187,185 | B1 | * | 2/2001 | Lee | 210/167.02 |
| 6,206,037 | B1 | * | 3/2001 | Murakoshi et al. | 137/565.34 |

| | | | |
|---|---|---|---|
| 6,217,758 B1* | 4/2001 | Lee | 210/167.06 |
| 6,220,454 B1* | 4/2001 | Chilton | 210/483 |
| 6,241,883 B1* | 6/2001 | Noda | 210/172.3 |
| 6,283,731 B1* | 9/2001 | Yoshioka | 417/423.3 |
| 6,290,843 B1* | 9/2001 | Lee et al. | 210/167.08 |
| 6,293,420 B1* | 9/2001 | Richter et al. | 220/563 |
| 6,293,770 B1* | 9/2001 | Matsumoto et al. | 417/361 |
| 6,308,733 B2* | 10/2001 | Murakoshi et al. | 137/565.34 |
| 6,343,589 B1* | 2/2002 | Talaski et al. | 123/514 |
| 6,361,691 B1* | 3/2002 | Dockery et al. | 210/242.1 |
| 6,382,190 B1* | 5/2002 | Tanabe et al. | 123/509 |
| 6,401,751 B2* | 6/2002 | Murakoshi et al. | 137/565.34 |
| 6,412,517 B1* | 7/2002 | Flambert et al. | 137/550 |
| 6,436,287 B1* | 8/2002 | Fischerkeller et al. | 210/232 |
| 6,451,205 B1* | 9/2002 | McGaw, Jr. | 156/73.3 |
| 6,464,872 B1* | 10/2002 | Honda | 210/416.4 |
| 6,471,072 B1* | 10/2002 | Rickle et al. | 210/486 |
| 6,471,863 B2* | 10/2002 | Kojima | 210/416.4 |
| 6,482,321 B1* | 11/2002 | Bossler et al. | 210/315 |
| 6,488,844 B2* | 12/2002 | Willis et al. | 210/172.2 |
| 6,513,503 B2* | 2/2003 | Iwamoto et al. | 123/509 |
| 6,551,509 B2* | 4/2003 | Appleton | 210/416.4 |
| 6,575,309 B1* | 6/2003 | Chiga | 210/435 |
| 6,582,599 B2* | 6/2003 | Ito et al. | 210/416.1 |
| 6,613,227 B2* | 9/2003 | Rickle | 210/243 |
| 6,638,423 B2 | 10/2003 | Dockery | |
| 6,640,832 B2* | 11/2003 | Walter | 137/565.01 |
| 6,675,778 B1* | 1/2004 | Kemper et al. | 123/516 |
| 6,736,273 B2* | 5/2004 | Chiga | 210/461 |
| 6,743,355 B2* | 6/2004 | Roth et al. | 210/175 |
| 6,821,422 B1* | 11/2004 | Brzozowski et al. | 210/416.4 |
| 6,830,687 B2* | 12/2004 | Dockery et al. | 210/416.4 |
| 6,833,070 B2* | 12/2004 | Fischer et al. | 210/232 |
| 6,843,913 B2* | 1/2005 | Grant | 210/234 |
| 6,851,396 B2* | 2/2005 | Fromont | 123/1 A |
| 6,857,859 B2* | 2/2005 | Herbers et al. | 417/87 |
| 6,863,814 B2* | 3/2005 | Okabe et al. | 210/416.4 |
| 6,868,836 B2* | 3/2005 | Buehler et al. | 123/509 |
| 6,874,643 B2* | 4/2005 | Iwamoto | 210/461 |
| 6,913,693 B2* | 7/2005 | Unuki | 210/416.4 |
| 6,923,164 B1* | 8/2005 | Mitsudou et al. | 123/509 |
| 6,929,742 B2* | 8/2005 | Wehrum et al. | 210/257.1 |
| 6,936,168 B2* | 8/2005 | Dockery et al. | 210/416.4 |
| 6,939,467 B2* | 9/2005 | Deichmann et al. | 210/416.4 |
| 6,951,208 B2* | 10/2005 | Milton | 123/509 |
| 6,953,527 B2* | 10/2005 | Brower et al. | 210/295 |
| 6,964,265 B2* | 11/2005 | Iwamoto | 123/510 |
| 6,974,537 B2* | 12/2005 | Abdelqader | 210/486 |
| 6,990,998 B1* | 1/2006 | Amellal et al. | 137/547 |
| 6,998,043 B2* | 2/2006 | Fischer et al. | 210/232 |
| 7,029,582 B2 | 4/2006 | Sato et al. | |
| 7,069,912 B2* | 7/2006 | Yoshioka | 123/509 |
| 7,069,913 B1* | 7/2006 | Crary | 123/509 |
| 7,087,160 B2* | 8/2006 | Beer et al. | 210/167.02 |
| 7,108,487 B2* | 9/2006 | Koba et al. | 417/360 |
| 7,112,278 B2* | 9/2006 | Yamada et al. | 210/232 |
| 7,117,854 B2* | 10/2006 | Schmitt | 123/509 |
| 7,128,218 B2* | 10/2006 | Rosendahl et al. | 210/455 |
| 7,134,568 B2* | 11/2006 | Moriyama et al. | 220/563 |
| 7,182,869 B2* | 2/2007 | Catlin et al. | 210/416.4 |
| 7,191,767 B2* | 3/2007 | Schmitt | 123/509 |
| 7,198,035 B2* | 4/2007 | Kadler et al. | 123/509 |
| 7,207,320 B2* | 4/2007 | Ikeya | 123/509 |
| 7,228,848 B1* | 6/2007 | Rangel et al. | 123/509 |
| 7,237,538 B2* | 7/2007 | Perruchot et al. | 123/509 |
| 7,279,095 B2* | 10/2007 | Usui et al. | 210/232 |
| 7,285,213 B2* | 10/2007 | Barz | 210/416.4 |
| 7,306,715 B2* | 12/2007 | Kato et al. | 210/136 |
| 7,329,339 B2* | 2/2008 | Kimisawa et al. | 210/136 |
| 7,350,509 B2* | 4/2008 | Barz et al. | 123/509 |
| 7,387,111 B2* | 6/2008 | Yu et al. | 123/509 |
| 7,407,057 B2* | 8/2008 | Vichinsky et al. | 210/437 |
| 7,429,322 B2* | 9/2008 | Fujita et al. | 210/172.4 |
| 7,478,729 B2* | 1/2009 | Sato et al. | 210/491 |
| 7,588,017 B2* | 9/2009 | Briggs et al. | 123/509 |
| 7,704,464 B2* | 4/2010 | Stephenson | 422/211 |
| 7,806,108 B2* | 10/2010 | Eck et al. | 123/509 |
| 7,857,143 B2* | 12/2010 | Oku et al. | 210/416.4 |
| 7,901,572 B2* | 3/2011 | Sato | 210/172.4 |
| 7,927,400 B2* | 4/2011 | Graber et al. | 95/59 |
| 7,964,096 B2* | 6/2011 | Kimisawa et al. | 210/172.4 |
| 7,998,347 B2* | 8/2011 | Pekarsky et al. | 210/253 |
| 8,017,009 B2* | 9/2011 | Arteche et al. | 210/323.1 |
| 8,029,667 B2* | 10/2011 | Santinon | 210/172.6 |
| 8,038,872 B2* | 10/2011 | Jokschas et al. | 210/86 |
| 8,038,877 B2* | 10/2011 | Stausberg et al. | 210/167.08 |
| 8,052,868 B2* | 11/2011 | Sato et al. | 210/172.4 |
| 8,079,479 B2* | 12/2011 | Leppert | 210/416.4 |
| 8,080,086 B2* | 12/2011 | Graber et al. | 95/59 |
| 8,114,278 B2* | 2/2012 | Lorente et al. | 210/188 |
| 8,137,546 B2* | 3/2012 | Ogose | 210/172.4 |
| 8,173,013 B2* | 5/2012 | Sato et al. | 210/172.4 |
| 8,246,819 B2* | 8/2012 | Sakata et al. | 210/167.08 |
| 2002/0017485 A1* | 2/2002 | Ito et al. | 210/416.4 |
| 2002/0023418 A1* | 2/2002 | Kojima | 55/379 |
| 2002/0074270 A1* | 6/2002 | Fischerkeller et al. | 210/97 |
| 2002/0079265 A1* | 6/2002 | Ito et al. | 210/416.4 |
| 2002/0095763 A1* | 7/2002 | Willis et al. | 29/453 |
| 2002/0100717 A1* | 8/2002 | Ueda et al. | 210/116 |
| 2002/0121473 A1* | 9/2002 | Boast et al. | 210/450 |
| 2002/0144943 A1* | 10/2002 | Unuki | 210/416.4 |
| 2002/0153300 A1* | 10/2002 | Appleton | 210/416.4 |
| 2003/0010692 A1* | 1/2003 | Sato et al. | 210/172 |
| 2003/0042185 A1* | 3/2003 | Dockery | 210/132 |
| 2003/0057149 A1* | 3/2003 | Iwamoto | 210/486 |
| 2003/0080046 A1* | 5/2003 | Ito | 210/416.4 |
| 2003/0111060 A1* | 6/2003 | Ito et al. | 123/509 |
| 2003/0132156 A1* | 7/2003 | Rickle | 210/416.4 |
| 2004/0000516 A1* | 1/2004 | Okabe et al. | 210/416.4 |
| 2004/0007520 A1* | 1/2004 | Rosendahl et al. | 210/435 |
| 2004/0020839 A1* | 2/2004 | Kato et al. | 210/232 |
| 2004/0037713 A1* | 2/2004 | Schelhas et al. | 417/313 |
| 2004/0045884 A1* | 3/2004 | Roth et al. | 210/184 |
| 2004/0129626 A1* | 7/2004 | Fischer et al. | 210/416.4 |
| 2004/0140257 A1* | 7/2004 | Dockery et al. | 210/416.4 |
| 2004/0144705 A1* | 7/2004 | Yamada et al. | 210/172 |
| 2004/0159602 A1* | 8/2004 | Brower et al. | 210/295 |
| 2004/0168971 A1* | 9/2004 | Sato et al. | 210/486 |
| 2004/0211396 A1* | 10/2004 | Burhenne et al. | 123/509 |
| 2004/0222142 A1* | 11/2004 | Yoshioka | 210/416.4 |
| 2004/0222143 A1* | 11/2004 | Kojima et al. | 210/416.4 |
| 2004/0251194 A1* | 12/2004 | Brzozowski et al. | 210/416.4 |
| 2005/0006300 A1* | 1/2005 | Sato et al. | 210/416.4 |
| 2005/0023201 A1* | 2/2005 | Sato | 210/172 |
| 2005/0029173 A1* | 2/2005 | Kimisawa et al. | 210/136 |
| 2005/0029180 A1* | 2/2005 | Kimisawa et al. | 210/172 |
| 2005/0061723 A1* | 3/2005 | Matsushita | 210/131 |
| 2005/0087178 A1* | 4/2005 | Milton | 123/509 |
| 2005/0098489 A1* | 5/2005 | Fischer et al. | 210/172 |
| 2005/0109685 A1* | 5/2005 | Fujita et al. | 210/172 |
| 2005/0115887 A1* | 6/2005 | Dockery et al. | 210/416.4 |
| 2005/0150826 A1* | 7/2005 | Sato et al. | 210/488 |
| 2005/0194306 A1* | 9/2005 | Barz | 210/416.4 |
| 2005/0236321 A1* | 10/2005 | Usui et al. | 210/416.4 |
| 2005/0286103 A1* | 12/2005 | Yu et al. | 359/198 |
| 2006/0016741 A1* | 1/2006 | Moriyama et al. | 210/172 |
| 2006/0070941 A1* | 4/2006 | Cline et al. | 210/416.4 |
| 2006/0076287 A1* | 4/2006 | Catlin et al. | 210/416.4 |
| 2006/0138035 A1* | 6/2006 | Izutani et al. | 210/172 |
| 2006/0180535 A1* | 8/2006 | Yu et al. | 210/232 |
| 2006/0219620 A1* | 10/2006 | Suga | 210/232 |
| 2006/0254974 A1* | 11/2006 | Khalil et al. | 210/420 |
| 2006/0266693 A1* | 11/2006 | Yoshida et al. | 210/335 |
| 2006/0266701 A1* | 11/2006 | Dickerson et al. | 210/503 |
| 2007/0007187 A1* | 1/2007 | Bahl | 210/172.3 |
| 2007/0095735 A1* | 5/2007 | Pizzo et al. | 210/172.4 |
| 2007/0181102 A1* | 8/2007 | Hazama | 123/514 |
| 2007/0199884 A1* | 8/2007 | Nakagawa | 210/416.4 |
| 2007/0215122 A1* | 9/2007 | Nakagawa et al. | 123/509 |
| 2007/0246420 A1* | 10/2007 | Sato | 210/416.4 |
| 2008/0183531 A1* | 8/2008 | Sato et al. | 210/435 |
| 2008/0245724 A1* | 10/2008 | Oku et al. | 210/416.4 |
| 2008/0290013 A1* | 11/2008 | Stausberg et al. | 210/167.04 |
| 2009/0039011 A1* | 2/2009 | Sato et al. | 210/491 |
| 2009/0050551 A1* | 2/2009 | Kimisawa et al. | 210/172.4 |
| 2009/0120858 A1* | 5/2009 | Kojima et al. | 210/167.08 |
| 2009/0139922 A1* | 6/2009 | Poskie et al. | 210/167.08 |
| 2009/0188574 A1* | 7/2009 | Eck et al. | 137/565.17 |

| | | | |
|---|---|---|---|
| 2009/0255515 A1* | 10/2009 | Eck et al. ...................... 123/509 |
| 2009/0301954 A1* | 12/2009 | Beer et al. ................ 210/167.08 |
| 2009/0321347 A1* | 12/2009 | Ogose ........................... 210/452 |
| 2010/0038296 A1* | 2/2010 | Beer et al. ................ 210/167.03 |
| 2010/0072120 A1* | 3/2010 | Sato ........................... 210/172.4 |
| 2010/0206793 A1* | 8/2010 | Oku et al. ................. 210/172.4 |
| 2010/0206802 A1* | 8/2010 | Sato et al. .................... 210/490 |
| 2010/0300950 A1* | 12/2010 | Kadler et al. ................ 210/232 |
| 2011/0036763 A1* | 2/2011 | Santinon ...................... 210/232 |
| 2011/0072838 A1* | 3/2011 | Leone et al. .................. 62/132 |
| 2011/0084015 A1* | 4/2011 | Frerichs et al. ............ 210/416.4 |
| 2011/0132825 A1* | 6/2011 | Nishio ...................... 210/172.4 |
| 2011/0155658 A1* | 6/2011 | Graber et al. ................. 210/243 |
| 2011/0180469 A1* | 7/2011 | Sato et al. .................. 210/172.4 |
| 2011/0192774 A1* | 8/2011 | Ogose .......................... 210/137 |
| 2011/0192786 A1* | 8/2011 | Nagai et al. .................. 210/443 |
| 2012/0240901 A1* | 9/2012 | Yamada et al. ............... 123/509 |

* cited by examiner

LIQUID FUEL STRAINER ASSEMBLY

TECHNICAL FIELD

The invention generally relates to a fuel sending unit for a fuel tank of a vehicle, and more specifically to a liquid fuel strainer assembly for filtering fuel entering a fuel pump of the fuel sending unit.

BACKGROUND

Liquid fuel strainer assemblies include a filter body formed from filtering media shaped to define an enclosed interior space. The liquid fuel strainer assembly is attached to an inlet of a fuel pump, and filters particulate matter from fuel as the pump draws the fuel therein. Some filter bodies are shaped by attaching a first wall to an opposing second wall around an outer peripheral edge thereof, thereby forming the enclosed interior space therebetween. In order to keep the first wall and the second wall from collapsing against each other as the pump suctions fuel therethrough, a separator may be over-molded onto one or both of the first wall and/or the second wall, and disposed between the first wall and the second wall. The over-molded separator may include a plurality of rails, ribs, pads, standoffs, etc., that space the first wall from the second wall. However, at the locations where the separator is attached to the filter body, the separator blocks fuel flow through the filtering media. Furthermore, if the filtering media includes multiple layers for filtering particulate matter of different sizes, the over-molded separator tends to compress the multiple layers together, thereby reducing the efficiency of the multi-layered structure.

SUMMARY

A liquid fuel strainer assembly is provided. The liquid fuel strainer assembly includes a filter body of filtration media having a first wall and an opposing second wall. The first wall and the second wall are configured to define an enclosed interior space therebetween. A fitting is secured to one of the first wall or the second wall. The fitting is configured for attachment to a fuel pump, and for providing fluid communication from the enclosed interior space of the filter body to the fuel pump. At least one flexible tube is disposed within the enclosed interior space of the filter body. The flexible tube is configured to prevent the first wall and the second wall from collapsing toward each other to allow fuel to flow through the enclosed interior space toward the fitting.

A fuel sending unit for a fuel tank of a vehicle is also provided. The fuel sending unit includes a fuel pump. A filter body of filtration media, having a first wall and an opposing second wall, is shaped to define an enclosed interior space between the first wall and the second wall. A fitting interconnects the filter body and the fuel pump. The fitting is secured to one of the first wall or the second wall of the filter body. The fitting provides fluid communication from the enclosed interior space of the filter body to the fuel pump. At least one flexible tube is disposed within the enclosed interior space of the filter body. The flexible tube is configured to prevent the first wall and the second wall from collapsing toward each other, to allow fuel to flow through the enclosed interior space toward the fitting. The flexible tube is not attached to either the fitting or the filter body, and is freely moveable within the interior space of the filter body relative to the first wall and the second wall.

Accordingly, the flexible tube disposed within the enclosed interior space of the filter body prevents collapse of the filter body. Because the flexible tube is not over-molded onto or otherwise attached to the filter body, the flexible tube does not block any surface area of the filter body, thereby increasing the filtering capacity of the strainer assembly. Furthermore, because the flexible tube is not over-molded onto the filter body, the various layers of the filter body are not compressed, thereby allowing the different filtering layers to function properly.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
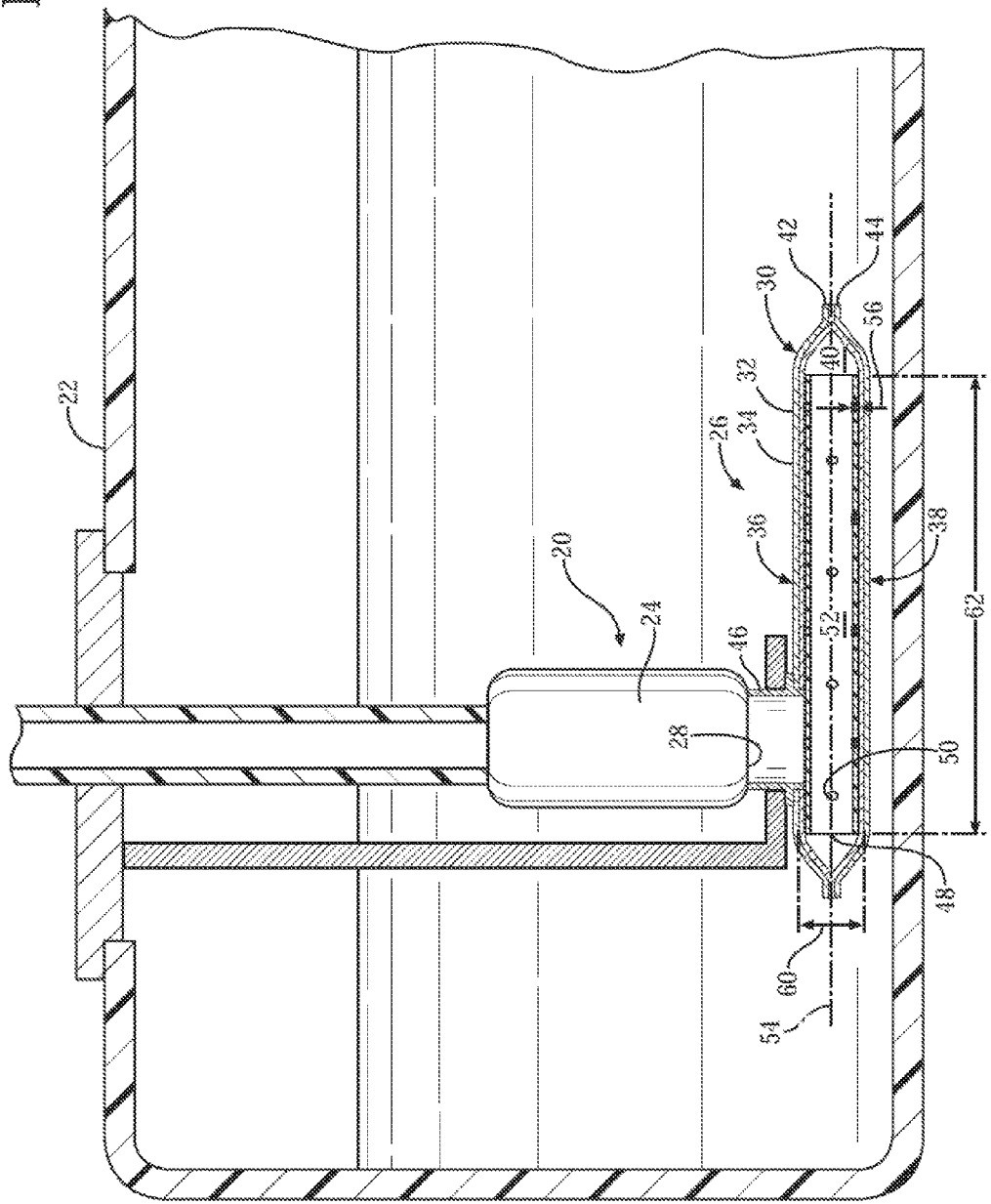
FIG. 1 is a schematic cross sectional view of a fuel tank showing a fuel sending unit disposed therein.

Referring to the Figures, wherein like numerals indicate like parts throughout the several views, a fuel sending unit is generally shown at 20. Referring to FIG. 1, the fuel sending unit 20 is disposed within an interior of a fuel tank 22 of a vehicle. The fuel sending unit 20 includes a fuel pump 24, which circulates fuel from the fuel tank 22 to an engine of the vehicle. In order to filter or block particulate matter or sediment suspended within the fuel, the fuel sending unit 20 includes a liquid fuel strainer 26. The liquid fuel strainer 26 is attached to an inlet 28 of the fuel pump 24 and filters or traps particulate matter greater than a pre-defined size, thereby preventing the particulate matter from flowing into the fuel pump 24 and through the fuel system of the vehicle.

Figure 2:
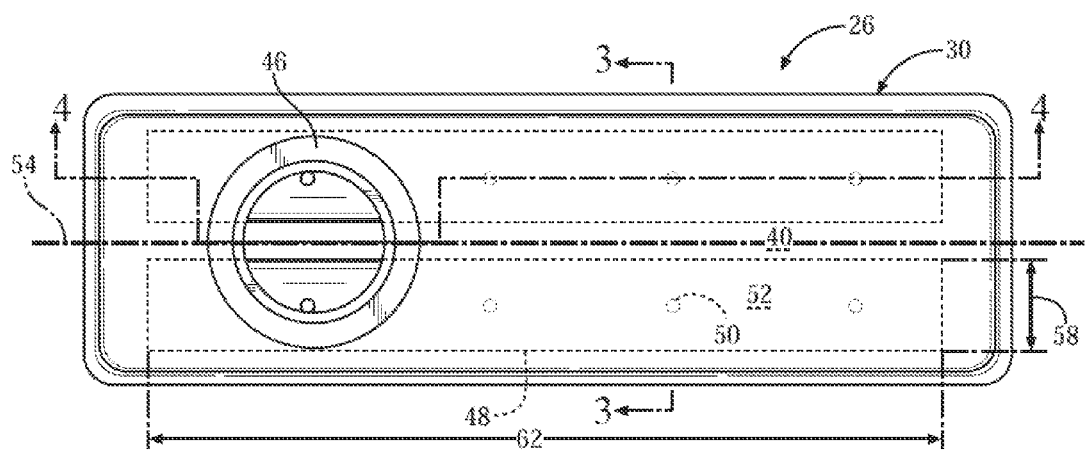
FIG. 2 is a schematic plan view of a liquid fuel strainer assembly of the fuel sending unit.
Figure 3:
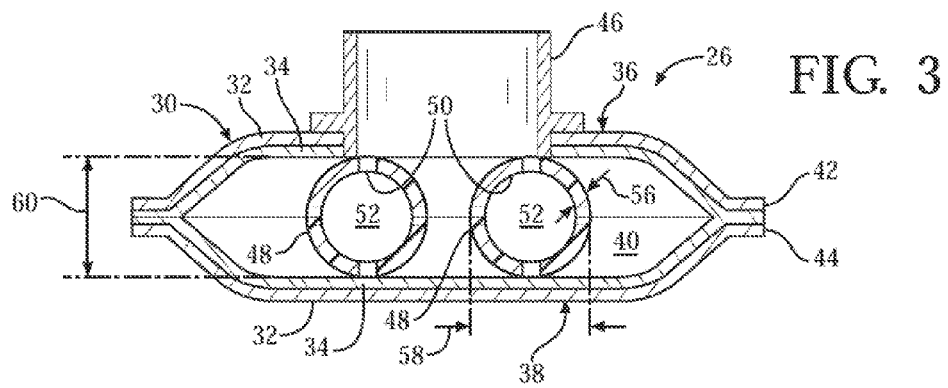
FIG. 3 is a schematic cross sectional view of the liquid fuel strainer assembly perpendicular to a longitudinal axis.
Figure 4:
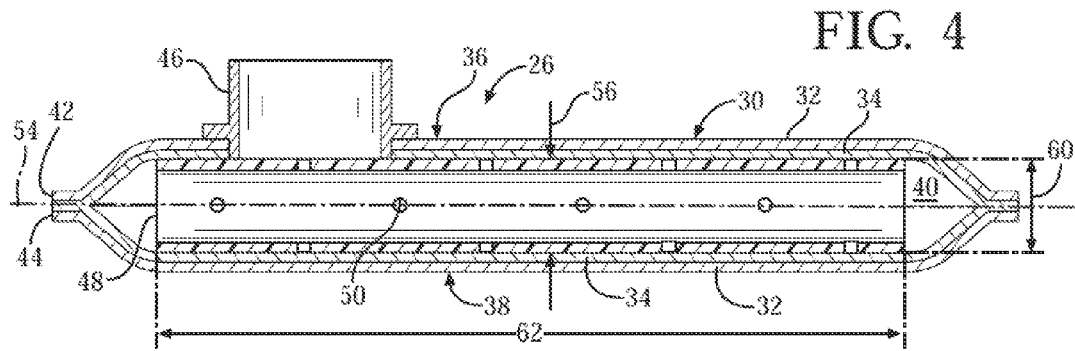
FIG. 4 is a schematic cross sectional view of the liquid fuel strainer assembly parallel to the longitudinal axis.

Referring to FIGS. 2 through 4, the liquid fuel strainer 26 assembly includes a filter body 30. The filter body 30 includes and is manufactured from a filtration media. The filtration media may include any media suitable for use within a hydrocarbon based fuel and capable of filtering or trapping particles of greater than a pre-defined size. The filtration media may include but is not limited to a woven or non-woven material, and may be manufactured from a material including but not limited to nylon. The filtration media may include one or more layers. As shown in FIGS. 3 and 4, the filtration media includes a first layer of media 32 and a second layer of media 34 disposed adjacent each other. The first layer of media 32 may define a first particulate filter size capable of filtering or trapping particles greater than a first pre-defined size, and the second layer of media 34 may define a second particulate filter size capable of filtering or trapping particles greater than a second pre-defined size. Preferably, the first particulate filter size is greater than the second particulate filter size so that larger particles are filtered by the first layer of media 32, and smaller particles are thereafter filtered by the second layer of media 34. It should be appreciated that the filter body 30 may include any number of layers.

As shown, the filter body 30 includes a first wall 36 and a second wall 38. The first wall 36 and the second wall 38 oppose each other, and are configured to define an enclosed interior space 40 therebetween. More specifically, the first wall 36 includes a first outer peripheral edge 42, and the second wall 38 includes a second outer peripheral edge 44. The first wall 36 and the second wall 38 are attached to each other at the first outer peripheral edge 42 and the second outer peripheral edge 44 of the first wall 36 and the second wall 38 respectively, thereby defining the enclosed interior space 40 therebetween.

A fitting 46 is secured to one of the first wall 36 or the second wall 38. As shown, the fitting is attached to the first wall 36. The fitting 46 is attached to the fuel pump 24, and connects the filter body 30 to the fuel pump 24. The fitting 46 may include any suitable shape and/or size, and may be attached to the filter body 30 and the inlet 28 of the fuel pump 24 in any suitable manner. The fitting 46 further provides fluid communication from the enclosed interior space 40 of the filter body 30 to the fuel pump 24. Accordingly, fuel from within the fuel tank 22 flows through the filtration media of the filter body 30 into the enclosed interior space 40 of the filter body 30, with particulate matter of greater than the pre-defined size being trapped within or filtered by the filtration media and blocked from entering the enclosed interior space 40. The fuel then flows through the enclosed interior space 40 to the inlet 28 of the fuel pump 24, whereupon the fuel pump 24 circulates the fuel through the fuel system of the vehicle.

At least one flexible tube 48 is disposed within the enclosed interior space 40 of the filter body 30. As shown in FIGS. 2 and 3, the liquid fuel strainer 26 includes two flexible tubes 48. However, it should be appreciated that the liquid fuel strainer 26 may include only a single flexible tube 48, or may alternatively include more than the two flexible tubes 48 shown. The flexible tubes 48 prevent the first wall 36 and the second wall 38 from collapsing toward each other while the fuel pump 24 draws fuel therein, thereby allowing the fuel to flow through the enclosed interior space 40 toward the fitting 46 and into the fuel pump 24. The flexible tubes 48 are not attached to the fitting 46 or the filter body 30, and are freely moveable within the interior space of the filter body 30 relative to the first wall 36 and the second wall 38. Furthermore, if the filtration media includes multiple layers, such as the first layer and the second layer shown in FIGS. 3 and 4, then the flexible tubes 48 do not compress the second layer of media 34 against the first layer of media 32 because the flexible tubes 48 are not bonded to or over-molded onto the filter body 30.

The flexible tubes 48 may include and be manufactured from a material that is chemically stable when immersed in a hydrocarbon based fuel, and does not leach into the fuel. The flexible tubes 48 may include a non-porous material, but may define one or more apertures 50 extending through the cross sectional wall and into a hollow center 52 of the flexible tubes 48.

Referring to FIGS. 3 and 4, the flexible tubes 48 include a cross section perpendicular to a longitudinal axis 54 that defines a tubular cross sectional shape having a wall thickness 56 and defining the hollow center 52. As shown in FIG. 3, the tubular cross sectional shape of the flexible tubes 48 includes a width 58 and a height 60 measured perpendicular to the longitudinal axis 54. As shown in FIG. 4, the flexible tubes 48 include a length 62 extending along the longitudinal axis 54.

The width 58 and the height 60 of the tubular cross sectional shape of the flexible tubes 48 may be equal to define a circular or square cross sectional shape. However, it should be appreciated that the width 58 and height 60 of the tubular cross sectional shape may differ to define an elliptical or rectangular cross sectional shape. Furthermore, it should be appreciated that the cross sectional shape of the flexible tubes 48 may include some other shape, such as a polygon.

The flexible tubes 48 include or define a flexibility, i.e., an ability to bend, that is dependent upon the cross sectional wall thickness 56 of the flexible tube 48, the width 58 of the cross sectional shape, the height 60 of the cross sectional shape, and the length 62 of the flexible tube 48 along the longitudinal axis 54. Accordingly, the flexibility of the flexible tube 48 may be altered to meet design parameters by altering one or more of the above described characteristics.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. In a fuel tank, the improvement comprising:
   a liquid fuel strainer assembly including:
   a filter body of filtration media having a first wall and an opposing second wall together defining an enclosed interior space therebetween;
   a fitting secured to one of the first wall or the second wall for attachment to a fuel pump and for providing fluid communication from the enclosed interior space of the filter body to the fuel pump; and
   at least two flexible tubes disposed within the enclosed interior space of the filter body, said flexible tubes having substantially solid sidewalls with spaced perforations through sidewalls thereof, wherein the at least two flexible tubes are not attached to either the fitting or the filter body, and are freely moveable within the interior space of the filter body relative to the first wall and the second wall, said flexible tubes preventing the first wall and the second wall from collapsing toward each other to allow fuel to flow through the enclosed interior space toward the fitting.

2. A fuel tank as set forth in claim 1 wherein said at least two flexible tubes are circular in cross-section.

3. A fuel tank as set forth in claim 1 wherein the filtration media includes at least a first layer of media and a second layer of media disposed adjacent each other.

4. A fuel tank as set forth in claim 3 wherein the first layer of media defines a first particulate filter size, and the second layer of media defines a second particulate filter size.

5. A fuel tank as set forth in claim 4 wherein the first particulate filter size is greater than the second particulate filter size.

6. A fuel tank as set forth in claim 4 wherein said at least two flexible tubes do not compress the second layer of media against the first layer of media.

7. A fuel tank as set forth in claim 1 wherein each of the first wall and the second wall include an outer peripheral edge, and wherein the first wall and the second wall are attached to each other at the outer peripheral edge of the first wall and the second wall respectively.

8. A fuel sending unit for a fuel tank of a vehicle, the fuel sending unit comprising:
   a fuel pump;
   a filter body of filtration media includes a first wall and an opposing second wall together shaped to define an enclosed interior space between the first wall and the second wall;

a fitting interconnecting the filter body and the fuel pump, and secured to one of the first wall or the second wall of the filter body, wherein the fitting provides fluid communication from the enclosed interior space of the filter body to the fuel pump; and at least two flexible tubes disposed within the enclosed interior space of the filter body, said flexible tubes having substantially solid sidewalls with spaced perforations through sidewalls thereof, said at least two flexible tubes preventing the first wall and the second wall from collapsing toward each other to allow fuel to flow through the enclosed interior space toward the fitting; wherein said flexible tubes are not attached to either the fitting or the filter body, and are freely moveable within the interior space of the filter body relative to the first wall and the second wall.

9. A fuel sending unit as set forth in claim 8 wherein said at least two flexible tubes are circular in cross-section.

10. A fuel tank comprising:

a fuel sending unit for a fuel tank of a vehicle, the fuel sending unit including:

a fuel pump;

a filter body of filtration media includes a first wall and an opposing second wall together shaped to define an enclosed interior space between the first wall and the second wall;

a fitting interconnecting the filter body and the fuel pump, and secured to one of the first wall or the second wall of the filter body, wherein the fitting provides fluid communication from the enclosed interior space of the filter body to the fuel pump; and at least two flexible tubes disposed within the enclosed interior space of the filter body, said flexible tubes having substantially solid sidewalls with spaced perforations through sidewalls thereof, said at least two flexible tubes preventing the first wall and the second wall from collapsing toward each other to allow fuel to flow through the enclosed interior space toward the fitting; wherein said flexible tubes are not attached to either the fitting or the filter body, and are freely moveable within the interior space of the filter body relative to the first wall and the second wall.

* * * * *